(12) United States Patent
Li

(10) Patent No.: US 12,103,496 B2
(45) Date of Patent: Oct. 1, 2024

(54) STORAGE COMPARTMENTS IN VEHICLES

(71) Applicant: Nissan North America, Inc., Franklin, TN (US)

(72) Inventor: Xin Shuang Li, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 354 days.

(21) Appl. No.: 17/514,367

(22) Filed: Oct. 29, 2021

(65) Prior Publication Data
US 2023/0138174 A1    May 4, 2023

(51) Int. Cl.
*B60R 7/04*    (2006.01)
*B60R 7/12*    (2006.01)

(52) U.S. Cl.
CPC ............... *B60R 7/043* (2013.01); *B60R 7/12* (2013.01)

(58) Field of Classification Search
CPC ................................. B60R 7/043; B60R 7/12
See application file for complete search history.

(56) References Cited

U.S. PATENT DOCUMENTS

| | | | | |
|---|---|---|---|---|
| 3,131,813 A * | 5/1964 | Jensen | ...................... | B60N 3/08 297/188.11 |
| 4,927,200 A * | 5/1990 | Wilkins | ................... | B60R 7/043 297/188.2 |
| 5,716,091 A * | 2/1998 | Wieczorek | ................ | B60R 7/02 296/37.16 |
| 5,902,009 A * | 5/1999 | Singh | ...................... | B60R 7/043 297/188.1 |
| 5,957,521 A * | 9/1999 | Schlachter | .............. | B60R 7/043 297/188.09 |
| 6,419,313 B1 * | 7/2002 | Newman | ................. | B60R 7/043 297/188.1 |
| 6,948,693 B2 * | 9/2005 | Goodbred | ............. | B60N 2/067 248/424 |
| 7,530,631 B2 * | 5/2009 | Skelly | .................. | B64D 11/064 297/188.21 |
| 7,780,229 B2 * | 8/2010 | Verhee | ..................... | B60N 2/58 297/188.21 |

(Continued)

FOREIGN PATENT DOCUMENTS

BR    PI0917563 B1 *  4/2019
DE    19836396 A1     3/1999
(Continued)

*Primary Examiner* — Justin M Larson
(74) *Attorney, Agent, or Firm* — Young Basile Hanlon & MacFarlane, P.C.

(57) ABSTRACT

A vehicle is disclosed that includes: a passenger seating area; a seat that is repositionable (e.g., movable, slidable) within the passenger seating area; an electromechanical system that is located beneath the seat and which is configured to support movement and/or reconfiguration of the seat; and a storage compartment that defines a receptacle for at least one personal accessory. The storage compartment is configured to conceal the electromechanical system to reduce the visibility thereof and is unitary in construction. The storage compartment is removably connected to the seat such that the storage compartment is fixed in relation to the seat but movable concomitantly with the seat during repositioning of the seat within the passenger seating area.

20 Claims, 5 Drawing Sheets

(56) References Cited

U.S. PATENT DOCUMENTS

| | | | | |
|---|---|---|---|---|
| 8,770,661 | B2* | 7/2014 | Kalergis | B60N 2/305 |
| | | | | 297/188.1 |
| 9,090,209 | B2* | 7/2015 | Aguirre | B60R 7/043 |
| 9,421,915 | B2* | 8/2016 | Kalergis | B60R 7/043 |
| 9,908,623 | B2* | 3/2018 | Hashberger | B64D 11/00 |
| 10,137,841 | B1* | 11/2018 | Neag | B60N 2/3047 |
| 10,160,392 | B2* | 12/2018 | Line | B60R 16/023 |
| 10,427,610 | B2* | 10/2019 | Nasca | B60R 7/043 |
| 10,625,680 | B1* | 4/2020 | Koehler | B60R 11/00 |
| 10,793,076 | B2* | 10/2020 | Brown | B60R 7/043 |
| 2006/0006704 | A1* | 1/2006 | Skelly | B64D 11/0636 |
| | | | | 297/188.08 |
| 2008/0061606 | A1* | 3/2008 | Skelly | B64D 11/064 |
| | | | | 297/188.1 |
| 2009/0001749 | A1* | 1/2009 | Johnson | B60R 7/043 |
| | | | | 296/37.15 |
| 2018/0326914 | A1* | 11/2018 | Coyle | B60N 2/01 |
| 2020/0247324 | A1* | 8/2020 | Brown | B60R 7/043 |
| 2023/0138174 | A1* | 5/2023 | Li | B60R 7/043 |
| | | | | 224/275 |

FOREIGN PATENT DOCUMENTS

| | | | | |
|---|---|---|---|---|
| DE | 19807319 | A1 * | 8/1999 | ........... B60N 2/3013 |
| DE | 102014005601 | A1 * | 11/2014 | ........... B60N 2/0284 |
| DE | 102018206555 | A1 * | 11/2018 | ........... B60N 2/005 |
| DE | 102018008614 | A1 * | 5/2019 | |
| FR | 2992264 | A1 * | 12/2013 | ............ B60R 7/043 |
| GB | 2562473 | A * | 11/2018 | ............ B60N 2/005 |
| GB | 2574788 | A * | 12/2019 | ............ B60N 2/4249 |
| KR | 20130090865 | A * | 8/1999 | |
| KR | 200156291 | Y1 * | 9/1999 | |

* cited by examiner

STORAGE COMPARTMENTS IN VEHICLES

TECHNICAL FIELD

The present disclosure relates to storage compartments in vehicles. More specifically, the present disclosure relates to a storage compartment that is connectable to a seat in the vehicle and which is configured to receive (accommodate) at least one personal accessory (e.g., an umbrella).

BACKGROUND

Vehicles often include storage compartments for personal accessories, which are typically located in the dashboard or the center console. The present disclosure, however, describes storage compartments that are configured for location beneath the (front) passenger seats to capitalize on space that may remain otherwise underutilized.

SUMMARY

In one aspect of the present disclosure, a vehicle is disclosed that includes: a passenger seating area; a seat that is repositionable (e.g., movable, slidable) within the passenger seating area; an electromechanical system that is located beneath the seat and which is configured to support movement and/or reconfiguration of the seat; and a storage compartment that defines a receptacle for at least one personal accessory. The storage compartment is configured to conceal the electromechanical system to reduce the visibility thereof and is unitary in construction. The storage compartment is removably connected to the seat such that the storage compartment is fixed in relation to the seat but movable concomitantly with the seat during repositioning of the seat within the passenger seating area.

In certain embodiments, the seat and the storage compartment may include corresponding securement members that are configured to facilitate repeated connection and disconnection of the storage compartment and the seat.

In certain embodiments, the receptacle may define a lateral dimension that lies substantially within the range of (approximately) 6" to (approximately) 12" and an axial dimension that lies substantially within the range of (approximately) 2" to (approximately) 3".

In certain embodiments, the receptacle may be configured to receive an umbrella such that the umbrella nests entirely within the receptacle.

In certain embodiments, the storage compartment may include: an upper wall; a guide wall that extends rearwardly from the upper wall so as to subtend an obtuse angle therewith; a rear wall that extends downwardly from the upper wall; a base wall that extends forwardly from the rear wall; and a lower wall that extends upwardly from the base wall, wherein the guide wall, the rear wall, the base wall, and the lower wall collectively define the receptacle.

In another aspect of the present disclosure, a vehicle is disclosed that includes: a passenger seating area; a seat that is repositionable (e.g., movable, slidable) within the passenger seating area; and a storage compartment that is connected to the seat such that the storage compartment is fixed in relation to the seat but movable concomitantly with the seat during repositioning of the seat within the passenger seating area.

In certain embodiments, the storage compartment may be configured for removable connection to the seat.

In certain embodiments, the seat and the storage compartment may include corresponding securement members that are configured to facilitate repeated connection and disconnection of the storage compartment and the seat.

In certain embodiments, the storage compartment may be unitary in construction.

In certain embodiments, the vehicle may further include an electromechanical system that is located beneath the seat and which is configured to support movement and/or reconfiguration of the seat.

In certain embodiments, the storage compartment may be configured to conceal the electromechanical system to reduce the visibility thereof.

In certain embodiments, the storage compartment may define a receptacle that is configured to receive the at least one personal accessory.

In certain embodiments, the receptacle may define a lateral dimension that lies substantially within the range of (approximately) 6" to (approximately) 12" and an axial dimension that lies substantially within the range of (approximately) 2" to (approximately) 3".

In certain embodiments, the receptacle may be configured to receive an umbrella such that the umbrella nests entirely within the receptacle.

In certain embodiments, the storage compartment may include a body and a door that is movably connected to the body such that the door is repositionable between an open position, in which the receptacle is accessible, and a closed position, in which the receptacle is inaccessible.

In another aspect of the present disclosure, a storage compartment for a vehicle is disclosed. The storage compartment is configured for connection to a seat in the vehicle in a manner inhibiting relative movement between the storage compartment and the seat but permitting movement of the storage compartment concomitantly with the seat during repositioning of the seat within the vehicle.

In certain embodiments, the storage compartment may include: an upper wall; a guide wall that extends rearwardly from the upper wall so as to subtend an obtuse angle therewith; a rear wall that extends downwardly from the upper wall; a base wall that extends forwardly from the rear wall; and a lower wall that extends upwardly from the base wall.

In certain embodiments, the guide wall, the rear wall, the base wall, and the lower wall may collectively define a receptacle that is configured to receive at least one personal accessory.

In certain embodiments, the storage compartment may include at least one securement member that is configured for releasable engagement with the seat in the vehicle such that the storage compartment is removably connectable to the seat.

In certain embodiments, the storage compartment may be unitary in construction.

In certain embodiments, the storage compartment may include a body and a door that is movably connected to the body such that the door is repositionable between an open position and a closed position.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
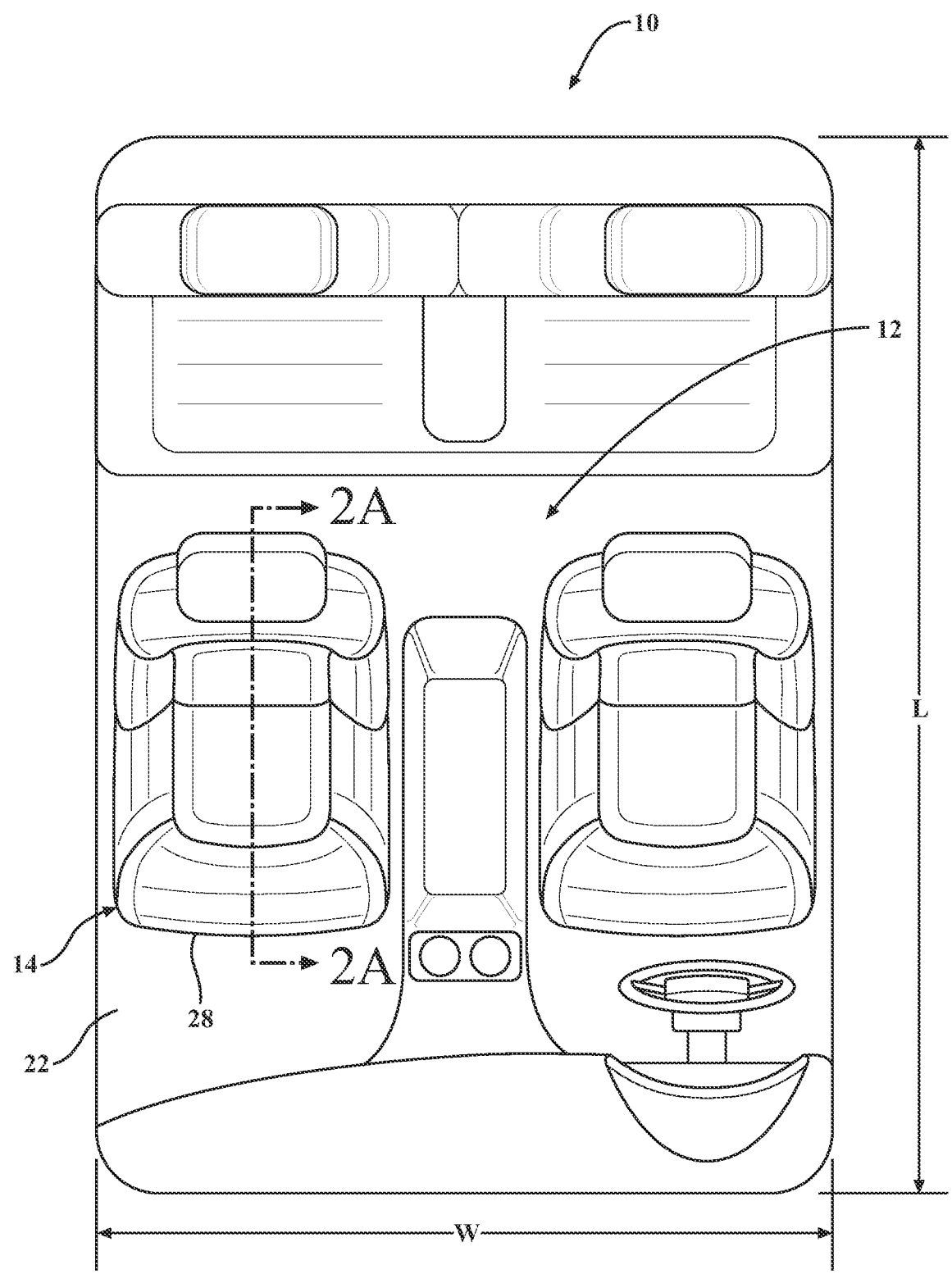
FIG. 1 is a partial, top, plan view of a vehicle including a storage compartment according to one embodiment of the present disclosure, which is configured for connection to a seat in the vehicle.
Figure 2:
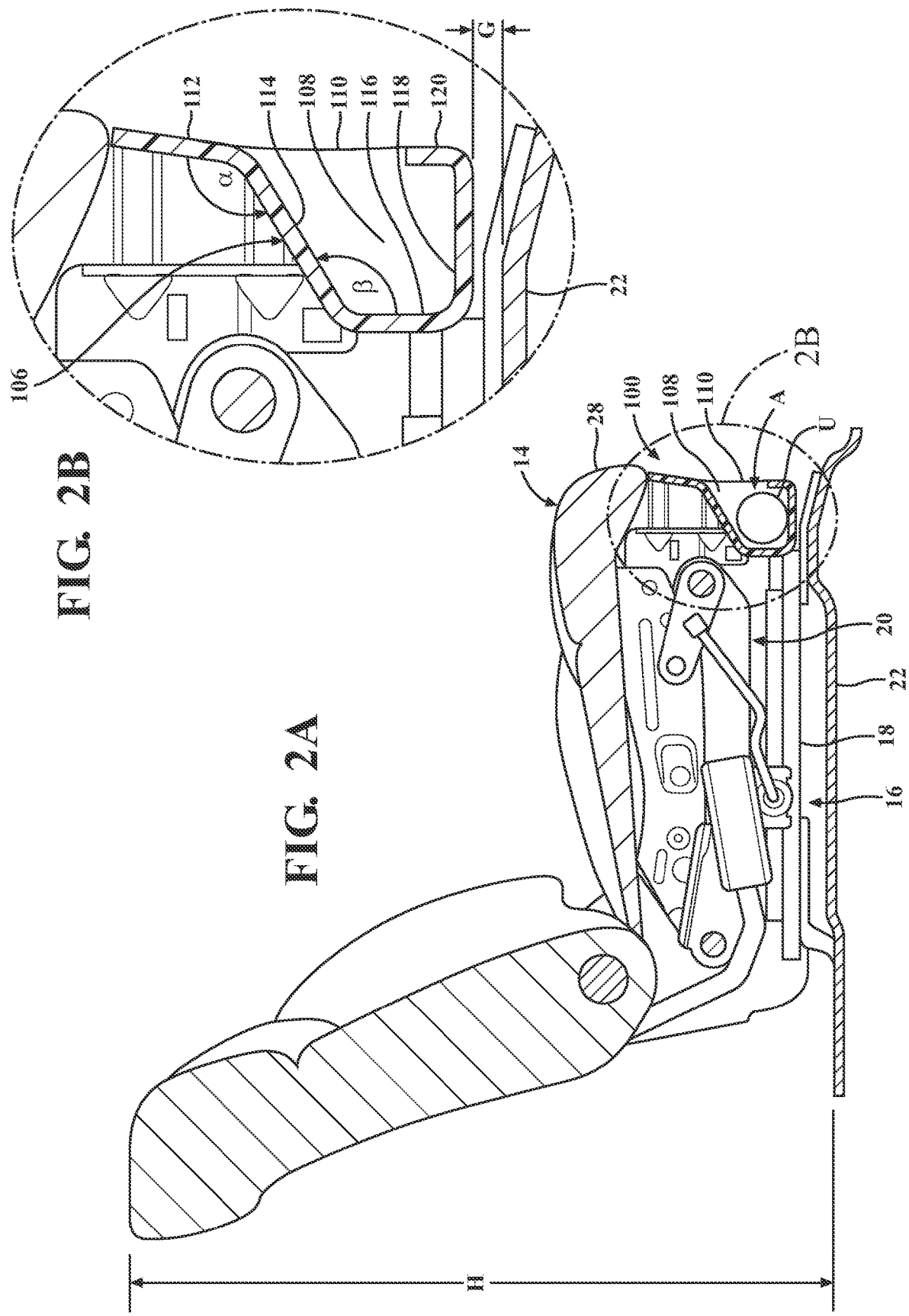
FIG. 2A is a cross-sectional view taken along line 2A-2A in FIG. 1.
FIG. 2B is an enlargement of the corresponding area of detail identified in FIG. 2A.
Figure 3:
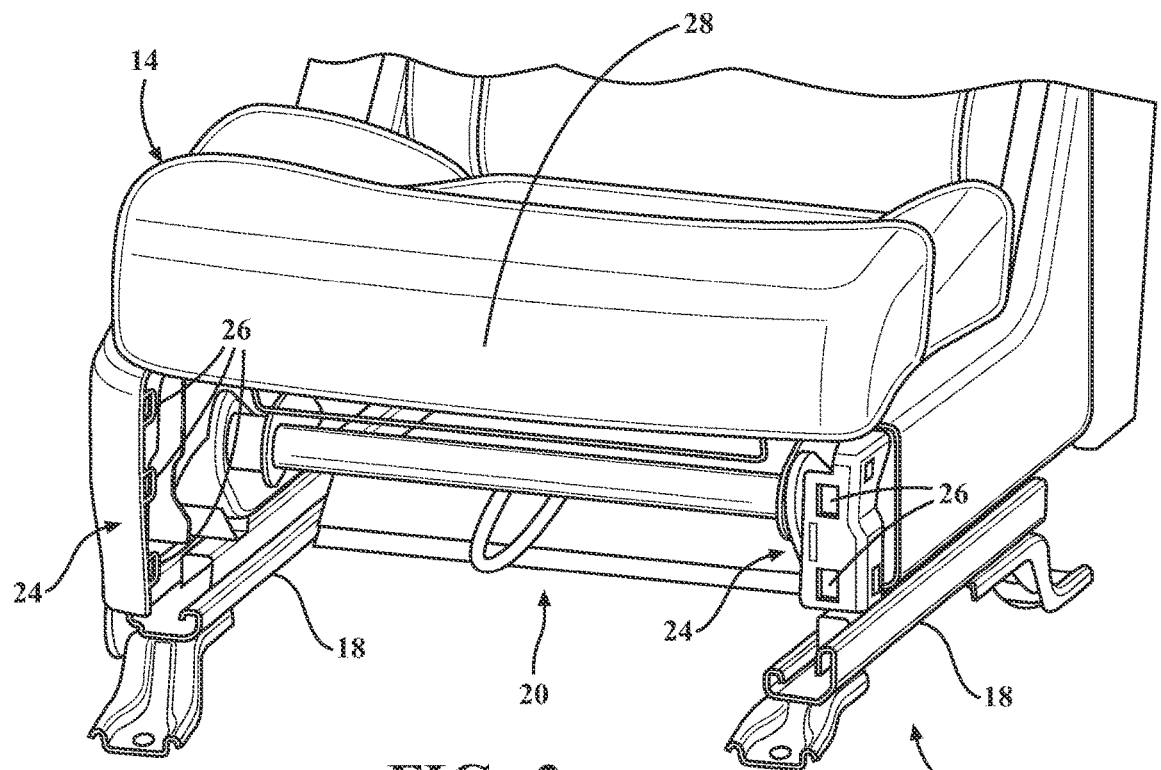
FIG. 3 is a partial, front, perspective view of a seat in the vehicle with the storage compartment removed.
Figure 4:
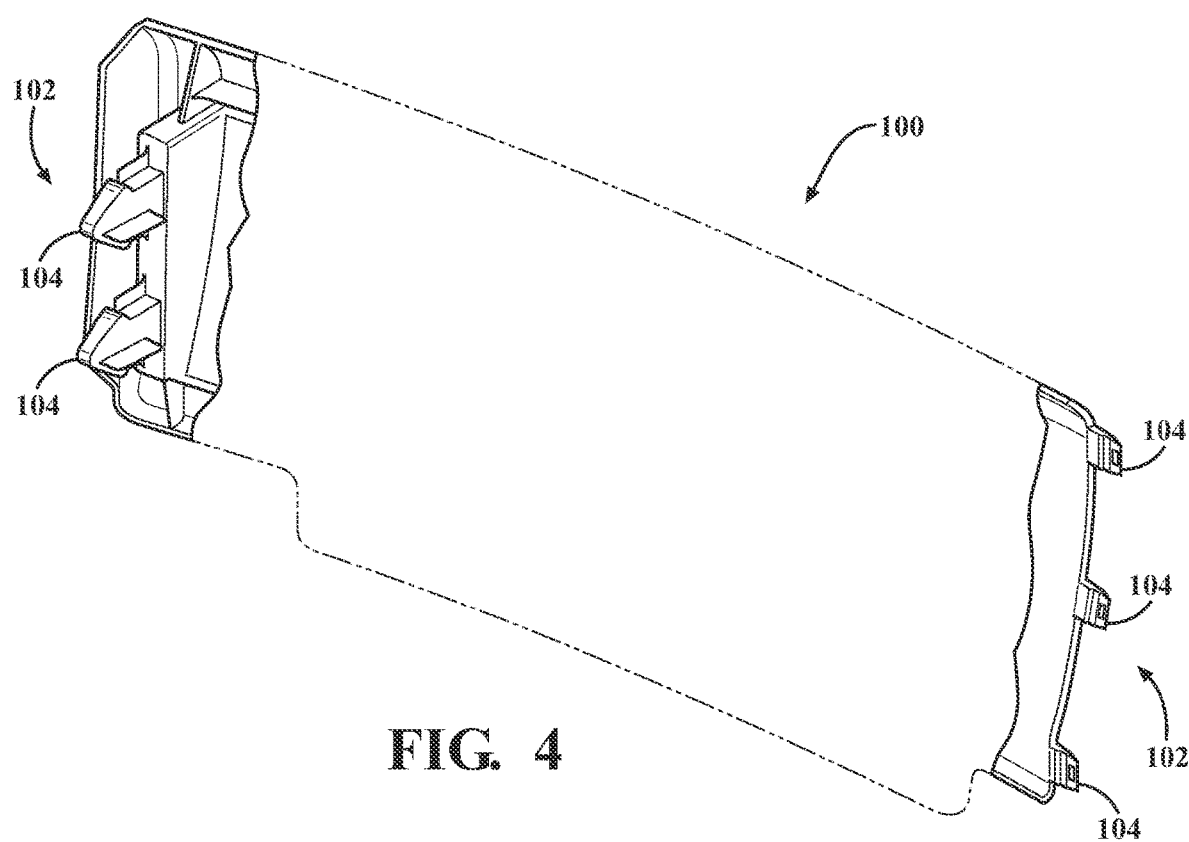
FIG. 4 is a partial, rear view of the storage compartment illustrating a plurality of securement members, which are configured to connect the storage compartment to the seat.

The present disclosure describes various embodiments of storage compartments for vehicles that are configured to receive at least one personal accessory (e.g., an umbrella). In one embodiment of the disclosure, the storage compartment is configured for connection to a seat in the vehicle. More specifically, the storage compartment is configured for connection to the seat in a manner that allows the storage compartment to remain stationary (fixed) in relation to the seat but move concomitantly with the seat during repositioning within the vehicle, which facilitates access to the storage compartment regardless of the position of the seat.

In an alternate embodiment of the disclosure, the storage compartment is entirely disconnected from the seat and is removably secured to the floor of the vehicle. To facilitate such securement, the storage compartment includes a plurality of retention members (e.g., hooks or the like) that are configured for releasable engagement with carpeting on the floor of the vehicle.

With reference to FIGS. 1-5, a vehicle 10 is illustrated that includes a passenger seating area 12; one or more seats 14; and a storage compartment (bin) 100. Although the vehicle 10 is generally illustrated and described as a passenger vehicle throughout the present disclosure, it should be appreciated that the components and functionality described herein may find applicability to wide variety of vehicles. For example, it is envisioned that the storage compartment 100 may be adapted for use with trucks, SUVs, vans, boats, airplanes, trains, etc.

Each seat 14 is movably supported by (e.g., connected to) a corresponding rail system 16, which includes a plurality of individual rails 18. The rail system 16 allows for repositioning of the seat 14 within the passenger seating area 12 via movement in one or more directions. For example, it is envisioned that the rail systems 16 and the seats 14 may be configured such that the seats 14 are movable (slidable) axially (e.g., along a length L of the vehicle 10) and/or laterally (e.g., along a width W of the vehicle 10). To support movement of the seats 14 and/or reconfiguration of the seats 14 (e.g., tilting, lumbar adjustment, etc.), the vehicle 10 includes one or more electromechanical systems 20. The electromechanical systems 20 are located beneath the seats 14 and may include any components suitable for the intended purpose(s) mentioned above (e.g., one or more motors, one or more wiring harnesses, etc.). In various embodiments of the disclosure, depending upon the style of the vehicle 10, spatial requirements, etc., it is envisioned that the electromechanical systems 20 may be connected to (or otherwise supported by) the seat 14, as seen in the embodiment illustrated throughout the figures, the rail systems 16, a floor 22 of the vehicle 10 (within the passenger seating area 12), or any other suitable structure or component of the vehicle 10.

The storage compartment 100 is configured to receive (accommodate, store) at least one personal accessory A. For example, in the particular embodiment illustrated throughout the drawings, the storage compartment 100 is configured to receive an umbrella U. It should be appreciated, however, that the storage compartment 100 may be configured to receive a variety of personal accessories A, which may vary in number and/or configuration. For example, it is envisioned that the storage compartment 100 may be configured to receive a cell phone, currency, tools, maps, valuables, a beverage container, etc.

The storage compartment 100 is secured to the seat 14 in a manner that inhibits (if not entirely prevents) relative movement therebetween while allowing for concomitant movement of the storage compartment 100 and the seat 14 during repositioning (e.g., sliding) of the seat 14 within the passenger seating area 12, which facilitates access to the storage compartment 100 regardless of the position of the seat 14. More specifically, the storage compartment 100 and the seat 14 include corresponding securement members 102, 24 (FIGS. 3, 4), respectively, which are configured for releasable engagement to facilitate removable connection of the storage compartment 100 and the seat 14 (e.g., repeated connection and disconnection of the storage compartment 100 and the seat 14). In the particular embodiment of the disclosure illustrated, the storage compartment 100 includes a plurality of clips 104 that are configured for removable insertion into corresponding openings 26 defined by the seat 14, thereby fixing the storage compartment 100 in relation to the seat 14 and allowing the storage compartment 100 to remain stationary in relation to the seat 14 during repositioning within the passenger seating area 12.

While the storage compartment 100 and the seat 14 are respectively shown as including five clips 104 and five openings 26, it should be appreciated that the particular configuration and/or number of securement members 102, 24 may be varied in alternate embodiments without departing from the scope of the present disclosure. For example, embodiments are envisioned herein in which the clips 104 and the openings 26 may be replaced by corresponding detents and recesses, fasteners, or other such suitable structures or mechanisms, as are embodiments in which the storage compartment 100 and the seat 14 may include greater and fewer numbers of securement members 102, 24, respectively. In one particular embodiment, for example, is envisioned that the storage compartment 100 and the seat 14 may each be provided with a single securement member 102, 24, respectively. Embodiments are also envisioned in which the locations of the clips 104 and the openings 26 may be reversed (e.g., such that the clips 104 are provided on the seat 14 and the openings 26 are defined by the storage compartment 100).

In certain embodiments of the disclosure, it is also envisioned that the storage compartment 100 and the seat 14 may be non-removably connected. For example, embodiments are envisioned in which the storage compartment 100 and the seat 14 may be formed as separate, discrete structures that are permanently connected together in a manner that prevents repeated connection and disconnection of the storage compartment 100 as are embodiments in which the storage compartment 100 and the seat 14 may be unitarily (e.g., integrally, monolithically) formed.

As seen in FIGS. 2A and 2B, the storage compartment 100 is configured to extend (at least partially) beneath the seat 14. More specifically, the storage compartment 100 is configured for positioning between the rails 18 and is entirely disconnected (disengaged) therefrom, which inhibits (if not entirely prevents) any interference with operation (e.g., movement and/or reconfiguration of the seat 14). Location of the storage compartment 100 beneath the seat 14 and between the rails 18 makes use of otherwise underutilized space in the passenger seating area 12 and conceals the electromechanical system 20 to not only protect the electromechanical system 20 (and the components thereof), but obscure the electromechanical system 20 from view to reduce the visibility thereof (either partially or entirely). To further enhance protection and concealment of the electromechanical system 20, in certain embodiments of the disclosure, it is envisioned that the storage compartment 100 may be configured to extend vertically from the seat 14 to a location adjacent to, but above, the floor 22 (e.g., so as not to interfere with movement of the seat 14 along the rails 18), as seen in FIGS. 2A and 2B. For example, it is envisioned that the storage compartment 100 may be configured so as to define a gap G (FIG. 2B) with the floor 22 that lies substantially within the range of (approximately) 0.25" to (approximately) 1". Embodiments in which the storage compartment 100 may be configured such that the gap G lies outside the disclosed range, however, would not be beyond the scope of the present disclosure.

The storage compartment 100 may include any suitable material or combination of materials and may be formed through any suitable method of manufacture (e.g., injection molding, casting, laser machining, etc.). For example, it is envisioned that the storage compartment 100 may include (e.g., may be formed partially or entirely from) one or more metallic materials, such as aluminum or stainless steel, and/or one or more non-metallic materials, such as one or more plastic materials, polymeric materials, and/or composite materials (e.g., carbon fiber).

To improve the overall aesthetic appearance of the passenger seating area 12, it is envisioned that the storage compartment 100 may correspond in color to the seat 14, to the floor 22 of the vehicle 10, etc. Additionally, it is envisioned that the material(s) used in construction of the storage compartment 100 may include a wipeable finish to facilitate cleaning of the storage compartment 100.

The storage compartment 100 includes a body 106 (FIGS. 2B, 5) defining an (open) receptacle 108. The receptacle 108 is configured to receive the personal accessory(ies) A and defines a mouth (opening, ingress) 110 that allows for insertion and removal thereof. More specifically, in the particular embodiment of the disclosure illustrated, the receptacle 108 defines a lateral dimension X that lies substantially with the range of (approximately) 6" to (approximately) 12" and extends in parallel (or generally parallel) relation to the width W of the vehicle 10 and an axial dimension Y that lies substantially with the range of (approximately) 2" to (approximately) 3" and extends in parallel (or generally parallel) relation to the length L of the vehicle 10, whereby the receptacle 108 is configured to receive the aforementioned umbrella U (FIG. 2A) such that the umbrella U nests entirely within (is completely received by) the receptacle 108. As indicated above, however, the storage compartment 100 may be configured to receive a variety of personal accessories A. Accordingly, it is envisioned that the receptacle 108 may be configured in manner suitable for that intended purpose and, as such, that the receptacle 108 may define dimensions that lie outside of the disclosed ranges without departing from the scope of the present disclosure.

Although shown as including a polygonal transverse cross-sectional configuration in the particular embodiment illustrated, embodiments of the storage compartment 100 in which the receptacle 108 may include a non-polygonal transverse cross-sectional configuration are also envisioned herein. For example, it is envisioned that the receptacle may include an arcuate (e.g., round) transverse cross-sectional configuration.

Figure 5:
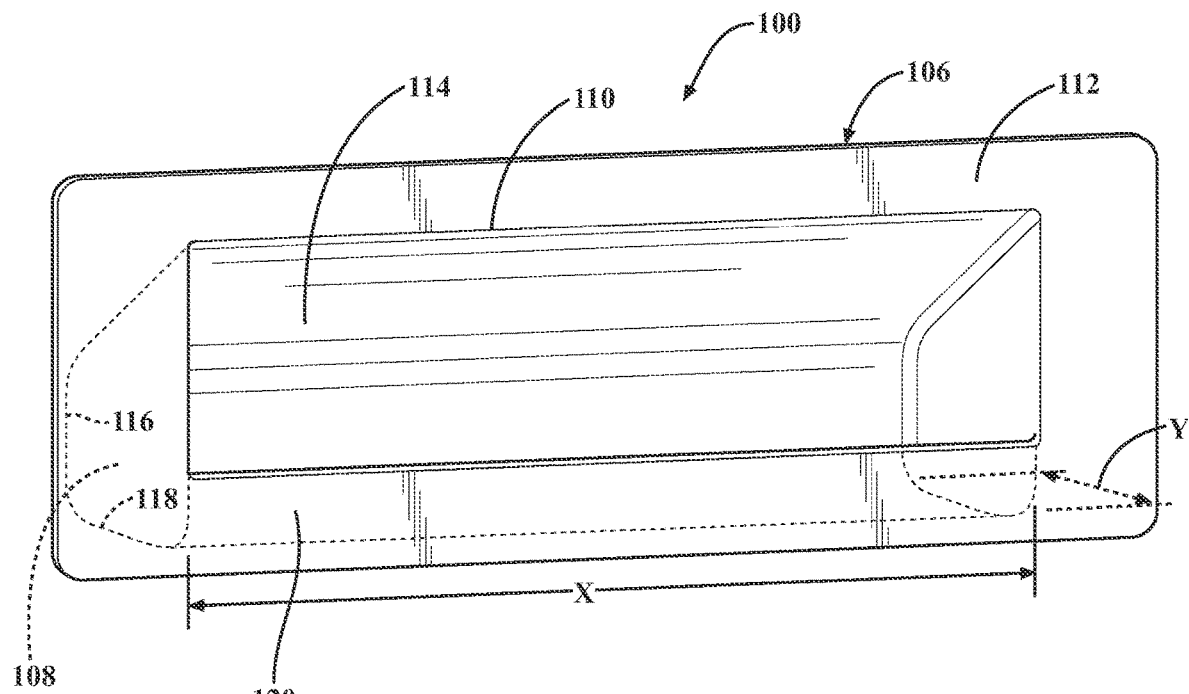
FIG. 5 is a front, perspective view of the storage compartment.

As seen in FIGS. 2B and 5, the body 106 of the storage compartment 100 includes: an upper wall 112; a guide wall 114; a rear wall 116; a base wall 118; and a lower wall (flange) 120, each of which is linear (or generally linear) in configuration.

In the particular embodiment of the storage compartment 100 illustrated, the upper wall 112 sits flush (or generally flush) with a forward (front) surface 28 (FIG. 2A) of the seat 14. Embodiments in which the upper wall 112 may extend axially beyond the forward surface 28 of the seat 14 (along the length L of the vehicle 10) are also envisioned herein, however, as are embodiments in which the upper wall 112 may be located axially rearward (behind) the forward surface 28 of the seat 14 such that the body 106 is positioned entirely beneath the seat 14.

The guide wall 114 extends rearwardly from the upper wall 112 (along the length L of the vehicle 10) so as to subtend an obtuse angle α (FIG. 2B) therewith. In the particular embodiment of the storage compartment 100 illustrated, the body 106 is configured such that the angle α lies substantially within the range of (approximately) 115° to (approximately) 150°. It should be appreciated, however, that the relative orientations of the upper wall 112 and the guide wall 114 and, thus, the angle α, may be varied without departing from the scope of the present disclosure. For example, embodiments in which the angle α may be equal (or approximately equal) to 90° are also envisioned herein, as are embodiments in which the angle α may be less than 90°.

The rear wall 116 extends (vertically) downward from the upper wall 112 (along a height H of the seat 14 and the vehicle 10) so as to subtend an obtuse angle β therewith (3 therewith, which corresponds to the angle α and is equal (or generally equal) thereto. As such, in the particular embodiment of the storage compartment 100 illustrated, the angle β lies substantially within the range of (approximately) 115° to (approximately) 150°. It should be appreciated, however, that the relative orientations of the guide wall 112 and the rear wall 116 and, thus, the angle (3, may be varied without departing from the scope of the present disclosure. For example, embodiments in which the angle β may be equal (or approximately equal) to 90° are also envisioned herein, as are embodiments in which the angle α may be less than 90° and embodiments in which the angles α, β may be unequal.

The base wall 118 extends forwardly from the rear wall 116 (along the length L of the vehicle 10) and towards the upper wall 112. In the particular embodiment of the storage compartment 100 illustrated, the body 106 is configured such that rear wall 116 and the base wall 118 are oriented in orthogonal (or generally orthogonal) relation. It should be appreciated, however, that the relative orientations of the rear wall 116 and the base wall 118 may be varied without departing from the scope of the present disclosure. As such, embodiments in which the rear wall 116 and the base wall 118 may be oriented so as to subtend either an acute angle or an obtuse angle therebetween are contemplated herein.

The lower wall 120 extends (vertically) upward from the base wall 118 (along the height H of the seat 14 and the vehicle 10) and towards the guide wall 114 and the upper wall 112 so as to define the receptacle 108, which extends between the guide wall 114, the rear wall 116, the base wall 118 and the lower wall 120. In the particular embodiment of the storage compartment 100 illustrated, the body 106 is configured such that base wall 118 and the lower wall 120 are oriented in orthogonal (or generally orthogonal) relation. It should be appreciated, however, that the relative orientations of the base wall 118 and the lower wall 120 may be varied without departing from the scope of the present disclosure. As such, embodiments in which the base wall 118 and the lower wall 120 may be oriented so as to subtend either an acute angle or an obtuse angle therebetween are contemplated herein (e.g., to vary the dimensions of the mouth 110 of the receptacle 108).

In the particular embodiment of the storage compartment 100 illustrated, the upper wall 112, the rear wall 116, and the lower wall 120 each extend in parallel (or generally parallel) relation to each other and in parallel (or generally parallel) relation the height H of the seat 14 (and the vehicle 10). It should be appreciated, however, that the particular configuration of the body 106 and/or the orientations of the upper wall 112, the rear wall 116, and/or the lower wall 120 may be altered in various embodiments without departing from the scope of the present disclosure (e.g., depending upon the particular configuration of the seat 14, spatial allowances/requirements, etc.).

It is envisioned that the securement members 102 (FIG. 4) may be provided on any suitable surface of the body 106. For example, depending upon the particular configuration of the seat 14, spatial allowances/requirements, etc., it is environed that the securement members 102 may be provided on the upper wall 112, the guide wall 114, and/or the rear wall 116, etc.

In the particular embodiment illustrated, the storage compartment 100 (e.g., the body 106) includes a unitary construction, whereby the storage compartment 100 is formed from a single piece of material and the upper wall 112, the guide wall 114, the rear wall 116, the base wall 118, and the lower wall 120 extend continuously from each other (in an uninterrupted manner). It should be appreciated, however, that embodiments of the storage compartment 100 are also envisioned herein in which the storage compartment 100 may be non-unitary in construction.

Figure 6:
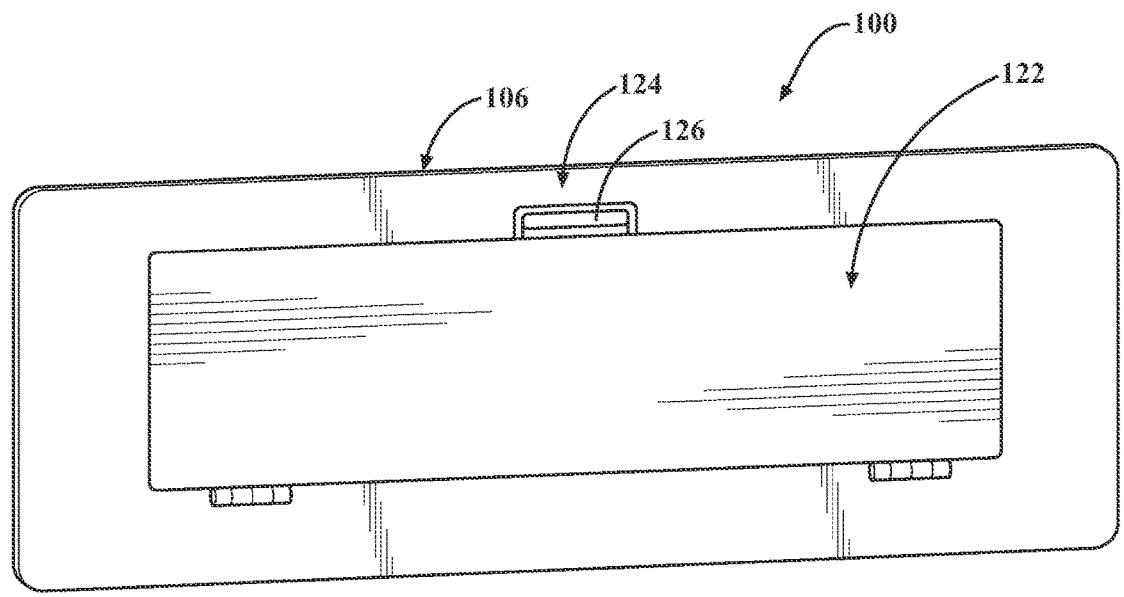
FIG. 6 is a front, perspective view of the storage compartment according to an alternate embodiment of the present disclosure.

In certain embodiments of the disclosure, it is envisioned that the storage compartment 100 may include a door 122 (FIG. 6) that is movably connected to the body 106 such that the door 122 is repositionable (movable) between an open position, in which the receptacle 108 is accessible (e.g., to allow for insertion and removal of the personal accessory (ies) A), and a closed position, in which the receptacle 108 is inaccessible (e.g., to secure the personal accessory(ies) A therein). It is envisioned that the door 122 may be connected to the body 106 in any manner suitable for the intended purpose of allowing for movement of the door 122 between the open and closed positions. For example, it is envisioned that the door 122 may be pivotably connected to the body 106, that the door 122 may be slidably connected to the body 106, that the door 122 may be rotatably connected to the body 106, etc.

In certain embodiments, it is envisioned that the door 122 may be integrated into the body 106 (e.g., via a living hinge) such that the door 122 and the body 106 are integrally (monolithically) formed so as to preserve the unitary construction of the storage compartment 100. Alternatively, it is envisioned that the door 122 may be provided as a separate, discrete component of the storage compartment (e.g., as a lid or a cover that is configured in correspondence with the receptacle 108).

To further enhance the protection offered by the storage compartment 100, it is envisioned that the door 122 may include a closure member 124 (e.g., a latch 126 or other such structure or mechanism) to secure the door 122 in the closed position. For example, it is envisioned that the closure member 124 may be configured for removable insertion into a corresponding opening defined by the body 106 or that the closure member 124 may include one or more magnetic members. In certain embodiments, it is also envisioned that the door 122 may include a locking mechanism (member) to further secure the door 122 in the closed position and enhance the security offered by the storage compartment 100.

Figure 7:
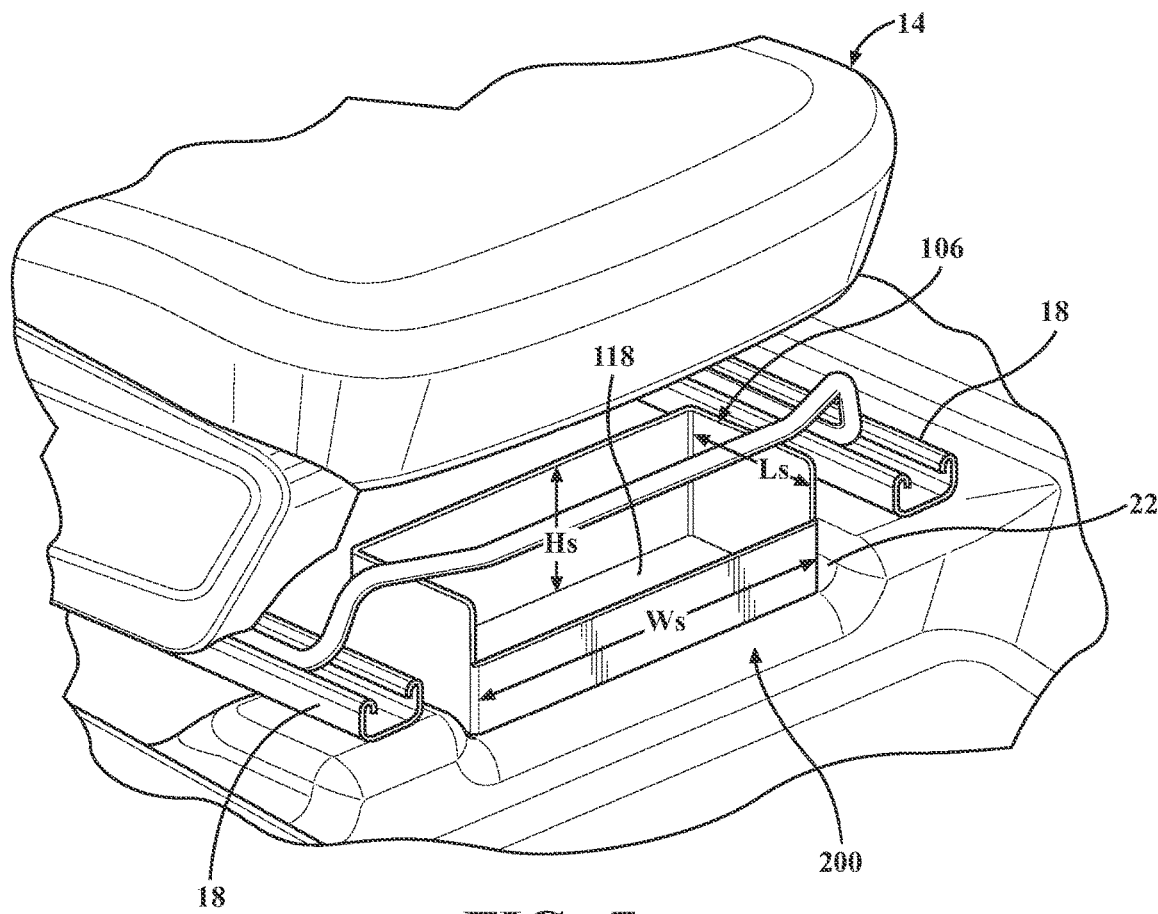
FIG. 7 is a partial, front, perspective view of a seat in the vehicle shown with an alternate embodiment of the storage compartment.
Figure 8:
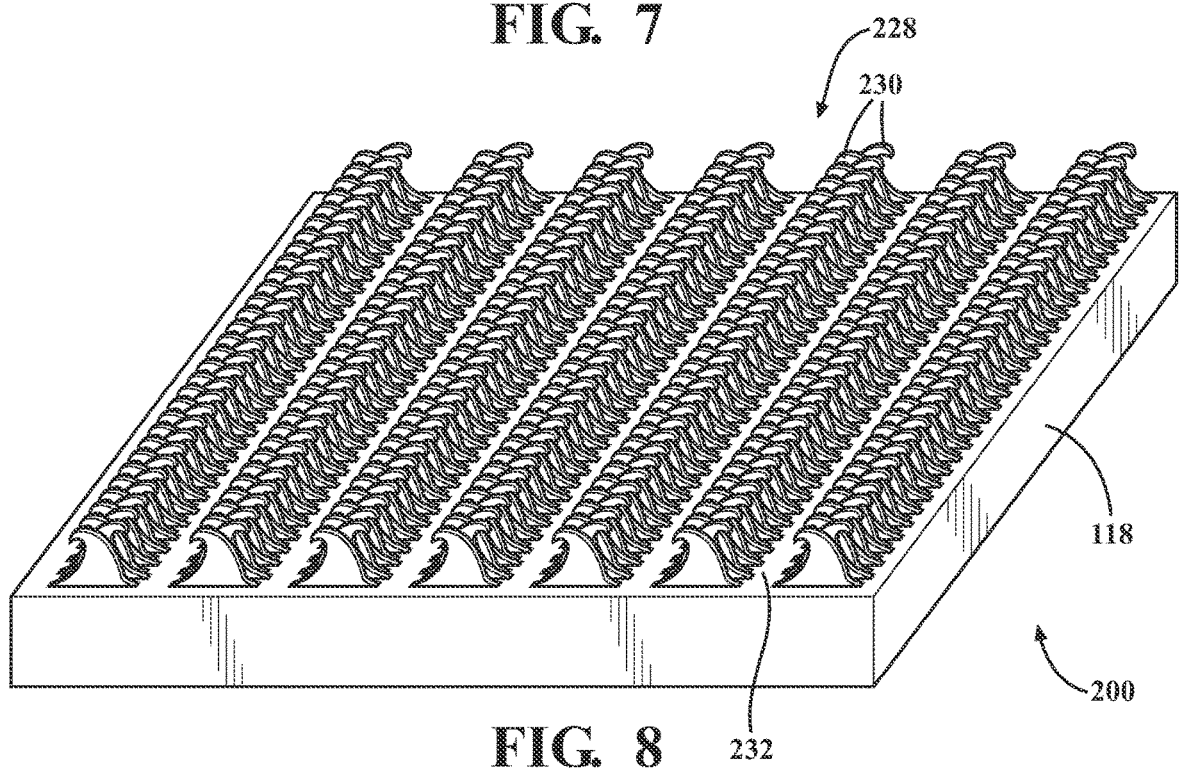
FIG. 8 is a partial, bottom, perspective view of the storage compartment seen in FIG. 7.

With reference now to FIGS. 7 and 8, an alternate embodiment of the storage compartment will be discussed, which is identified by the reference character 200. The storage compartment 200 is substantially similar in both structure and function to the storage compartment 100 discussed above and, accordingly, in the interest of brevity, will only be discussed with respect to any differences therefrom. As such, identical reference characters will be utilized to refer to elements, structures, features, etc., common to the storage compartments 100, 200.

As with the storage compartment 100, the storage compartment 200 is located beneath the seat 14 and is entirely disconnected (disengaged) from the rails 18. To facilitate such placement, the storage compartment 200 defines a length Ls that lies substantially with the range of (approximately) 3" to (approximately) 5" and extends in parallel (or generally parallel) relation to the length L (FIG. 1) of the vehicle 10, a width Ws that lies substantially with the range of (approximately) 10" to (approximately) 14" and extends in parallel (or generally parallel) relation to the width W (FIG. 1) of the vehicle 10, and a height Hs that lies substantially with the range of (approximately) 3" to (approximately) 5" and extends in parallel (or generally parallel) relation to the height H (FIG. 2A) of the seat 14 (and the vehicle 10). It should be appreciated, however, the configuration of the storage compartment 200 may be varied in alternate embodiments to facilitate placement beneath the seat 14 in the manner descried herein and that the storage compartment 200 may define dimensions that lie outside of the ranges disclosed above without departing from the scope of the present disclosure (e.g., depending upon the particular configuration of the seat 14, spatial allowances/requirements, etc.).

In contrast to the storage compartment 100, the storage compartment 200 is entirely disconnected (disengaged) from the seat 14. Instead, the storage compartment 200 is configured for removable securement to (releasable engagement with) the floor 22 of the vehicle 10 (within the passenger seating area 12). More specifically, the storage compartment 200 includes a plurality of retention members 228 (e.g., hooks 230 or the like) that are configured for releasable engagement with (connection to) the floor 22 (e.g., to the carpeted overlayment). As seen in FIG. 8, in the particular embodiment of the storage compartment 200 illustrated, the retention members 228 are provided on a bottom surface (underside) 232 of the base wall 118. It is envisioned, however, that the retention members 228 may be provided in any suitable location(s).

In the particular embodiment of the storage compartment 200 illustrated, the retention members 228 are formed integrally (monolithically) with the body 106 (e.g., the base wall 118). For example, it is envisioned that the retention members 228 may be molded with the base wall 118 during manufacture of the storage compartment 200. It is also envisioned, however, that the body 106 and the retention members 228 may be formed separately and that the retention members 228 may be connected to the body 106 (either fixedly or removably) in any suitable manner. For example, it is envisioned that the retention members 228 may be provided on a plate that may be secured to the body 106 (e.g., the base wall 118), which may allow for replacement of the retention members 228 in the event of damage, excessive wear and tear, etc.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle, comprising:
   a passenger seating area;
   a seat repositionable within the passenger seating area;
   an electromechanical system located beneath the seat and configured to support movement and/or reconfiguration of the seat; and
   a storage compartment defining a receptacle for at least one personal accessory and configured to conceal the electromechanical system to reduce visibility thereof, the storage compartment being configured such that the receptacle extends beneath the seat in a rearward direction, the storage compartment being unitary in construction and removably connected to the seat such that the storage compartment is flush in relation to a forwardmost surface thereof, wherein the storage compartment is fixed in relation to the seat but movable concomitantly with the seat during repositioning of the seat within the passenger seating area.

2. The vehicle of claim 1, wherein the seat and the storage compartment include corresponding securement members configured to facilitate repeated connection and disconnection of the storage compartment and the seat.

3. The vehicle of claim 1, wherein the receptacle defines a lateral dimension substantially within a range of approximately 6" to approximately 12" and an axial dimension substantially within a range of approximately 2" to approximately 3".

4. The vehicle of claim 3, wherein the receptacle is configured to receive an umbrella such that the umbrella nests entirely within the receptacle.

5. The vehicle of claim 1, wherein the storage compartment includes:
   an upper wall;
   a guide wall extending rearwardly from the upper wall so as to subtend an obtuse angle therewith;
   a rear wall extending downwardly from the guide wall;
   a base wall extending forwardly from the rear wall; and
   a lower wall extending upwardly from the base wall, the guide wall, the rear wall, the base wall, and the lower wall collectively defining the receptacle.

6. A vehicle, comprising:
   a passenger seating area;
   a seat repositionable within the passenger seating area; and
   a storage compartment connected to the seat such that the storage compartment is flush in relation to a forwardmost surface thereof, wherein the storage compartment is fixed in relation to the seat but movable concomitantly with the seat during repositioning of the seat within the passenger seating area, wherein the storage compartment extends beneath the seat in a rearward direction.

7. The vehicle of claim 6, wherein the storage compartment is configured for removable connection to the seat.

8. The vehicle of claim 7, wherein the seat and the storage compartment include corresponding securement members configured to facilitate repeated connection and disconnection of the storage compartment and the seat.

9. The vehicle of claim 6, wherein the storage compartment is unitary in construction.

10. The vehicle of claim 6, wherein the vehicle further includes an electromechanical system located beneath the seat and configured to support movement and/or reconfiguration of the seat.

11. The vehicle of claim 10, wherein the storage compartment is configured to conceal the electromechanical system to reduce visibility thereof.

12. The vehicle of claim 6, wherein the storage compartment defines a receptacle configured to receive the at least one personal accessory.

13. The vehicle of claim 12, wherein the receptacle defines a lateral dimension substantially within a range of approximately 6" to approximately 12" and an axial dimension substantially within a range of approximately 2" to approximately 3".

14. The vehicle of claim 13, wherein the receptacle is configured to receive an umbrella such that the umbrella nests entirely within the receptacle.

15. The vehicle of claim 12, wherein the storage compartment includes:
   a body; and
   a door movably connected to the body such that the door is repositionable between an open position, in which the receptacle is accessible, and a closed position, in which the receptacle is inaccessible.

16. A storage compartment for a vehicle, the storage compartment being configured for connection to a seat in the vehicle in a manner inhibiting relative movement between the storage compartment and the seat but permitting movement of the storage compartment concomitantly with the seat during repositioning of the seat within the vehicle, wherein the storage compartment includes:
   an upper wall;
   a guide wall extending rearwardly from the upper wall so as to subtend an obtuse angle therewith;
   a rear wall extending downwardly from the guide wall;
   a base wall extending forwardly from the rear wall; and
   a lower wall extending upwardly from the base wall, the guide wall, the rear wall, the base wall, and the lower wall collectively defining a receptacle configured to receive at least one personal accessory.

17. The storage compartment of claim 16, wherein the storage compartment includes at least one securement member configured for releasable engagement with the seat in the vehicle such that the storage compartment is removably connectable to the seat.

18. The storage compartment of claim 16, wherein the storage compartment is unitary in construction.

19. The storage compartment of claim 16, wherein the storage compartment includes:
   a body; and
   a door movably connected to the body such that the door is repositionable between an open position and a closed position.

20. The storage compartment of claim 16, wherein the receptacle is configured to receive an umbrella such that the umbrella nests entirely within the receptacle.

* * * * *